United States Patent [19]

Kadah et al.

[11] Patent Number: 4,820,964
[45] Date of Patent: Apr. 11, 1989

[54] SOLID STATE MOTOR START CIRCUIT

[75] Inventors: Andrew S. Kadah, 5000 Henneberry Rd., Manlius, N.Y. 13104; Kenneth G. Frazer, Clay, N.Y.

[73] Assignee: Andrew S. Kadah, Manlius, N.Y.

[21] Appl. No.: 158,300

[22] Filed: Feb. 19, 1988

Related U.S. Application Data

[63] Continuation-in-part of Ser. No. 899,018, Aug. 22, 1986, abandoned.

[51] Int. Cl.$^4$ .................................................. H02P 1/42
[52] U.S. Cl. ..................................... 318/786; 318/791
[58] Field of Search ......................... 318/785–795, 318/345 D, 345 H, 471–473; 361/24–27, 32, 34

[56] References Cited

U.S. PATENT DOCUMENTS

| | | | |
|---|---|---|---|
| 3,071,719 | 1/1963 | Latter | 318/473 |
| 3,320,505 | 5/1967 | Miller et al. | 318/785 |
| 3,365,639 | 1/1968 | Jacobs | 318/785 |
| 3,539,892 | 11/1970 | Lindberg | 318/345 H |
| 3,543,090 | 11/1970 | Pfister et al. | 361/27 |
| 3,549,970 | 12/1970 | Lewus | 361/32 |
| 3,728,606 | 4/1973 | Finnegan et al. | |
| 3,846,683 | 11/1974 | Laursen | 318/791 |
| 3,916,274 | 10/1975 | Lewus | |
| 4,197,532 | 4/1980 | Lawson, II | 361/33 |
| 4,276,506 | 6/1981 | Little | |
| 4,463,304 | 7/1984 | Miller | |
| 4,574,229 | 3/1986 | Kim | 361/24 |

OTHER PUBLICATIONS

G. E. Silicon Controlled Rectifier Manual, General Electric, 1964, pp. 205–211.

Primary Examiner—David Smith, Jr.
Attorney, Agent, or Firm—Wall and Roehrig

[57] ABSTRACT

A start circuit for a single phase AC induction motor employs an impedance in series with the run winding to develop a voltage drop proportional to the current through the run winding, and a pair of LEDs or another light emitting device across this impedance to produce a light output whose intensity varies with the field current, and hence in a generally inverse relation with motor speed. A solid-state AC current switch, which can be a triac or a pair of back-to-back SCRs, is gated by a photosensitive circuit that includes a photosensitive element. A light conduit, which can be a light pipe or light dome, for example, carries the light output from the light emitting element to the photosensitive element. The device of this circuit is highly reliable, has no mechanical contacts, and is relatively insensitive to temperature and voltage fluctuation.

10 Claims, 9 Drawing Sheets

SOLID STATE MOTOR START CIRCUIT

This is a continuation-in-part of co-pending application Ser. No. 899,018, filed on Aug. 22, 1986, now abandoned.

BACKGROUND OF THE INVENTION

The present invention relates to starting systems for AC induction motors, and is particularly directed to an improved speed-sensing motor start control, especially one employed for controlling AC current that is supplied to the start winding of an AC induction motor. It should be noted here that motor speed and motor current are inversely proportional; as such is the case, current sensing can be used as a mechanism to characterize motor speed.

It is well known that AC single-phase induction motors require some sort of starting mechanism to rotate the magnetic field of the field windings, so as to generate sufficient torque to start the rotor. The starting mechanism enables the rotor to overcome the static forces associated with accelerating the rotor and load, for example, from a zero initial angular velocity.

Typically, single-phase induction motors are equipped with at least two sets of windings: a run winding for driving the rotor at normal speed and an auxiliary or start winding to generate the required starting torque. In order to provide the necessary rotating field for the starter, a phase-shifting device, typically a capacitor, is connected in series with the start winding. During start up of the motor both the run and auxiliary windings are utilized to bring the motor up to a sufficient high speed. Thereafter, the start or auxiliary winding is disconnected, so that the motor will operate on the run winding only for more efficient operation. In the event that a heavy load is encountered and the motor rpm decreases significantly, the auxiliary winding may be cut in to add torque to overcome the increased load.

In most AC induction motors, the structure of the auxiliary winding is such that sustained connection to the AC line voltage would overheat and possibly destroy the start windings, if not the entire motor. For the start winding circuits in split-phase motors, the start capacitor is also susceptible to damage if the auxiliary or start winding is not disconnected after the motor has achieved its designed cut out rpm. In other types of multiple winding motors, the shaft may not accelerate completely to its designed full speed until the auxiliary or start winding cuts out. Therefore, an efficient and cost-effective control circuit is necessary for automatically connecting and disconnecting the auxiliary or start windings at the appropriate times during and after start under and high load conditions.

An ideal motor starting control device should have the following desirable characteristics:

A. The starting device should disconnect the start auxiliary winding at a predetermined speed, independent of actual line voltage, load, and temperature.

B. Whenever the motor shaft load exceeds the motor torque and a breakdown is exceeded, the device should cut in the start auxiliary winding prior to the stalling of the motor.

C. The device should have long life and high reliability, even in the presence of line voltage surges.

D. The device should cut in and cut out the start winding without requiring adjustment, with either connection with a dual-voltage motor or with a capacitor start or other split-phase motor.

E. Alignment with the shaft or rotor should not be required. More specifically, the control element may be remotely installed and independent of the physical location of the motor.

F. A single calibration should satisfy all required ratings.

G. The device should be capable of operation at different voltages, including high voltages (i.e., above 240 vac).

H. The device should be subject to adjustment via a simple means, such as a potentionmeter.

Until recently, the start circuit for controlling the current to the motor start windings has taken the form either of a mechanical centrifugal switch, located on the armature or shaft, or an electromechanical current-sensing relay device. Because of the arcing and wear problems associated with motor switching currents, both the centrifugal switch and the current-sensing relay have proved to have rather short lives and do not meet the reliability criteria mentioned above.

Centrifugal switch systems, however, do have the advantages of voltage and temperature independence, low initial cost, and a switching action which is dependent entirely on the rotation speed of the motor shaft, regardless of the load. Also, upon heavy loading and significantly decreased motor speed, the centrifugal switch will reconnect or cut in the start winding. The main drawback of the centrifugal switch is that, because it utilizes a set of mechanical contacts, it is susceptible to pitting and arcing, and the contacts will eventually fail. A corrosive, humid or dusty environment will accelerate the contact failure. Centrifugal switches have a life expectancy typically much less than 1,000,000 operations at full load. In the event of centrifugal switch failure the contacts often weld themselves closed, thus sending continuous AC current through the start capacitor and start windings, possibly destroying these elements. Centrifugal switches are not readily field replaceable or adjustable as they are located internally within the motor housing. A further disadvantage is related to unreliable switching levels with age due to metal ratigue in the activating mechanism.

The current-sensing relay type device has the advantages of low cost, temperature independence, and permitting the start winding to start or cut in at a predetermined speed dependent only on current. This device, however, does utilize mechanical contacts and has a rather short life expectancy for the same reasons as the centrifugal switch. In addition, this type of system has a positional dependency associated with its mounting, as it relies on gravity, at least in part, to open the switch contacts. Other drawbacks include noise due to contact movement and the possibility that the relay contacts stick or remain closed during high current surges. This type of failure engages the start winding for an indefinite prolonged period of time thus damaging both the start winding and the start capacitor. An improved type of motor starting circuit, which employs a reed/triac combination, has been proposed, for example, in Fink et al U.S. Pat. No. 3,766,457. This type of motor starting circuit is a low cost, temperature independent approach, and cuts in or cuts out the start windings based on field current, which increases with decreased motor speed. This type of circuit also has a relatively long life, as compared to the above mentioned centrifugal switch and current-sensing relay, because the heavy start current load is handled through a solid-state power triac. The overall performance of this device is rather good; however, it does have several drawbacks.

One drawback is that it requires heavy current-carrying conductor wire to be wrapped around the reed switch in order to generate a specific magnetic field to effect reed closure. Heavy duty motors often have field windings of fourteen gage wire or heavier, and it is difficult to effect the proper number of turns of this heavy wire around the rather miniscule reed switch bulb to generate the specific magnetic field necessary for reed switch closure for a particular induction motor. Also, the reed switch contacts open and close twice during each cycle of the alternating current, and considering that a start up may have a duration of ten seconds, there will be 1,200 reed contact transfers effected for each start up operation. Consequently, the device life is quite load dependent. As with any device with moving parts, the reed switch will eventually arc and wear and will finally freeze into an open or closed state. Finally it is required that the reed switch bulb be located where it will be insulated from chattering or vibration, which could damage this device or reinsert the start windings undesirably.

Another disadvantage of reed switches is the effect of extraneous magnetic fields sometimes present in the same environment which will effect operation of the reed switch thus altering motor performance. Further, reed switches offer a major drawback in manufacturing whereby selection of individual reeds with a certain ampere-turns is required for proper operation of the motor reed switch combination.

An attempt at a completely solid-state motor starting circuit was proposed in Lewus U.S. Pat. No. 3,916,275. This motor starting control circuit fulfills nearly all of the ideal characteristics mentioned previously, most significantly a long lifetime due to the absence of mechanical parts or contacts. However, there are several significant weaknesses to this motor starting control circuit.

The circuit of the Lewus Patent relies on the facts a. that a certain voltage will develop across a sensing element in series with the run windings, and b. that this voltage can be rectified and applied between the gate and main terminal #1 of a triac to gate the same. This system employs a current sense resistor to develop a voltage in excess of the trigger diodes to the gate of the triac. The circuit operation is very much dependent on the gate sensitivity of the triac. During starting in rush, significant voltage must be present across the sense resistor to trigger the triac and enable the start windings; which may not occur if the input line voltage is low. Conversely, an input line voltage that is higher than nominal will cause excessive voltage and current to be present at the triac gate during in rush, possibly destroying the triac. Because the system is so dependent on triac gate sensivity, calibration is difficult as a result of the device dependency. Most importantly, however, the system is dependent on supply voltage, unlike the present invention.

Another desirable feature for semiconductor-control starting circuits is the option to stack triacs or other equivalent power switching devices, especially for higher voltage applications (i.e., with a motor voltage above 240 VAC). However, with the Lewus triggering scheme, the power triacs may not be stacked; that would only be possible if the circuit that senses the current through the sense resistors were somehow electrically isolated from the triac. Only by triggering a triac from its gate to its second main terminal can the triac be stacked or combined. An example of this type of stacking, with reference to the reed-triac type of motor control circuit, is shown in Miller U.S. Pat. No. 4,463,304. Other proposed motor start control circuits have included timer-controlled semiconductor switches to connect the start circuitry for a prescribed amount of time. This approach, while avoiding some of the drawbacks of the above-mentioned devices, does not rely on motor speed at all and thus cannot sense an overload condition; therefore, it may cut out start winding prematurely upon start up. Because it is a timed device, the control cannot permit reinsertion of start winding in the event of heavy loading after start up. Another type of start control circuit employs a positive temperature coefficient resistor to disable the start windings after a start up. This system is both temperature sensitive and very slow to reset because the positive temperature coefficient element must cool down completely before it can cut in the start winding.

OBJECTS AND SUMMARY OF THE INVENTION

Accordingly, it is an object of this invention to provide an improved motor starting control system which avoids the drawbacks of the prior art.

It is another object of this invention to provide a motor start control circuit which achieves all of the desired characteristics for a start control circuit as mentioned above. It is a more particular object of this invention that the starting device cuts in and cuts out at a predetermined motor speed, independent of voltage, load, or temperature; that the starting control circuit cut in the start winding of the motor whenever a breakdown torque is exceeded, but before the motor stalls; that the device have the characteristics of long life and reliability, despite possible surges and line voltages; that the device perform without requiring adjustment; that there be no requirement for alignment with a shaft or rotor; and that the device be capable of operation with high voltage motors, that is, motors exceeding the voltage capability of a single triac.

In accordance with an aspect of this invention, a start circuit is connected to a single phase AC induction motor of the type having at least one run winding accompanied by a start winding in series with an optional phase-shifting device, such as a capacitor. The start circuit connects the start winding to the AC input during a start up operation and disconnects the start winding once the motor has achieved a certain speed. The start circuit employs an impedance means in series with at least one of the run windings or all windings of the motor, developing a voltage thereacross that varies with the current through the windings. Favorably, the impedance means is the heater resistor of a thermal cutout which is incorporated into the motor as a safety feature. A light emitting element is connected to the impedance means for providing a light output whose intensity varies with said voltage, thus with the winding current, and hence, motor speed. An AC current switch device, e.g. a triac, has current electrodes in series with the start winding, start capacitor, and a gate electrode. A photosensitive circuit, which includes a photosensitive element, produces an output signal that varies with the intensity of light incident on the photosensitive element, and this circuit has an output electrode that supplies this output signal to the gate electrode of the AC current switch device. A light conduit, which can be a light pipe or a light dome, carries the light output from the light emitting element to the photosensitive element of the photosensitive circuit, to actuate the same when the motor speed is below a threshold. Preferably, the AC current switch element is a triac or like device or combination of devices. The light emitting means can include an incandescent lamp, a single light emitting diode with capacitor filter for a DC source or an inverse parallel pair of light emitting diodes. Other circuitry can be substituted for the photosensitive circuit and light emitting means to apply an actuating signal to the triac or other switch device.

With this type of device the current sensing impedance may be electrically isolated from the triac, and the triac switches on or off entirely on the basis of light levels generated by the light source. This system is dependent only on the current sensed by the sense impedance, that it lacks any sort of mechanical opening and closing devices, and is capable of operating under any number of alternative conditions. In addition, it is possible to stack the triacs, semiconductor switches or other like arrangements so that high voltage AC induction motors can be readily accommodated. The value of the sense resistor or impedance can be selected for a particular cut in or cut out level, and no other adjustments are required during the life of the device unless otherwise desired or required.

Many other objects, features, and advantages of this invention will be more fully understood from the ensuing detailed description of a number of preferred embodiments, which description should be considered in connection with the accompanying drawing.

BRIEF DESCRIPTION OF THE DRAWING

FIG. 1A is a diagram of a second embodiment analagous to that of FIG. 1 but wherein the sense resistor is in circuit with the run winding only.

FIGS. 3, 3A, and 4 show fourth, fifth, and sixth embodiments analagous to the first, second, and third embodiments employing SCR devices for high power applications.

FIGS. 13 and 13A are circuit diagrams of fifteenth and sixteenth embodiments of this invention which employ rectifiers to deliver a DC voltage to their respective light emitting means. FIGS. 14 and 14A are seventeenth and eighteenth embodiments of this invention which employ photodiodes as or lascars their respective photoelectric elements.

DETAILED DESCRIPTION OF THE PREFERRED EMBODIMENTS

Figure 1:
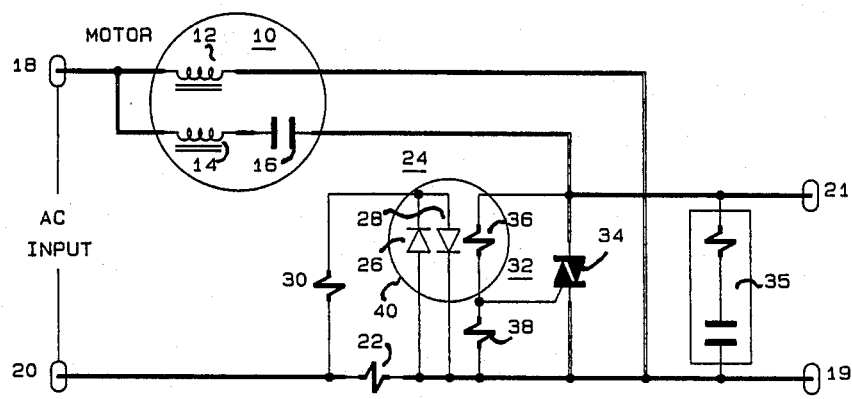
FIG. 1 is a schematic circuit diagram of a motor control circuit according to a first embodiment of this invention, wherein the sense resistor is in series with both start and run windings.
Figure 1:
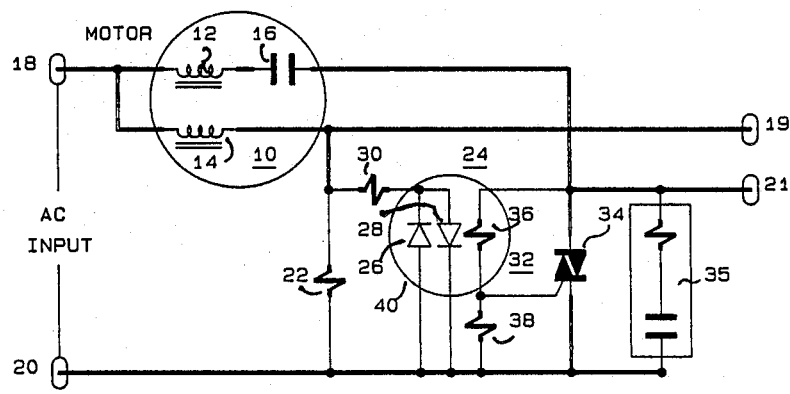
Figure 9:
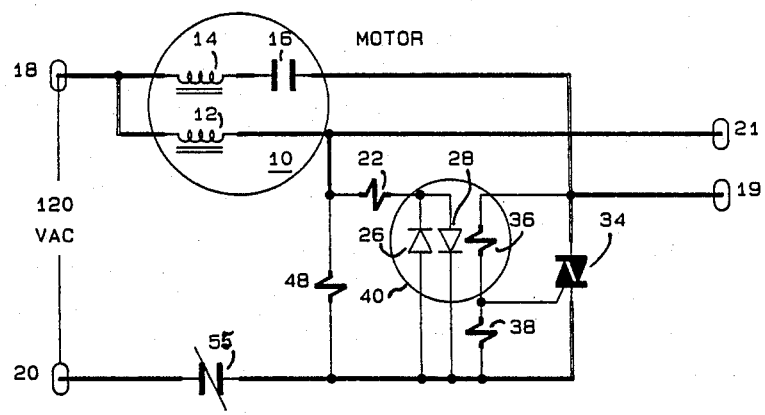
FIG. 9 is a diagram of an eleventh embodiment of this invention which employs the heater of a thermal cut out switch as its sense resistor.

With reference to the drawing, and initially to FIG. 1 thereof, an AC single-phase induction motor employing the motor starting control circuit of this invention has field windings 10 which include at least one run winding 12 and a start winding 14. The rotor magnetic field is produced inductively as there is no direct connection to the rotor, so the rotor is not illustrated here. The start winding 14 is connected in series with a start capacitor 16 and the semiconductor AC switch (triac) 34 between AC input terminals 18 and 20, and the run winding 12 is also connected to these input terminals 18 and 20. The start capacitor 16 need not be employed in every instance as other means may shift the current in the start winding 14. A current sensing resistor 22 (typically 0.02 ohm to 1.0 ohm) is in series between the AC input terminal 20 and the start and run windings 12 and 14. The resistor 22 can be the heater resistor of a thermal cutout switch which is typically incorporated in series with the run winding. This element is found in substantially all AC induction motors to cut off run current if the same exceeds a safe level for a prolonged period of time. In this embodiment and in those that follow, the series sensing resistor 22 will be assumed to be such a heater resistor. A thermal cutout switch per se is shown in FIG. 9. A light-generating circuit 24 is connected across this resistor 22 and here is formed of first and second LEDs 26 and 28, connected back-to-back, i.e., anti-parallel or anode-to-cathode, with a protective current limiting resistor 30 in series with the pair of LEDs 26 and 28. The LEDs 26 and 28 are current-sensitive and voltage-sensitive devices and will generate an amount of light that is generally proportional to the current through resistor 30. This current is directly related to the voltage drop across the sensing resistor 22, and the latter voltage drop depends directly on the current through windings 12 and 14. LEDs 26 and 28, in addition to the brightness variation due to current change, will provide a definite switching action enabling, definite cut in and cut out levels of the start winding. It is readily observed that, as such, the LEDs will provide the start up switching due to heavy in rush current or heavy loading and profile cut out of the start winding during normal operation.

A solid-state AC switching circuit 32 is formed of a triac 34 which has a first main power terminal or current-carrying electrode connected to the sensing resistor 22, a second main power terminal connected to the start capacitor 16, and a gate electrode. A photosensitive circuit is formed of a series connection of photoresistor 36 and an ohmic resistor 38 connected across the power terminals of the triac 34 with the gate of the latter being connected to the junction between the photoresistor 36 and the optional ohmic resistor 38. The solid-state AC switching circuit 32 is electrically isolated from the light generating circuit 24, except at their common connection with the sensing resistor 22 and with the first main power terminal of the triac 34. Any signalling between the LEDs 26, 28, and the photoresistor 36 of the solid-state AC switching circuits 32 occurs optically. To effect this, a light dome 40 couples the LEDs 26, 28, and the photoresistor 36 and conducts the light emitted from the LEDs to the photoresistor 36. A light pipe could alternatively be employed. An ohmic or other non-optical circuit could be substituted for the above elements to actuate the triac 34.

It should be noted that resistor 38 is not required for the operation of the circuit and further that portion of the current circuit comprised of resistor 22, resistor 30, and LEDs 26 and 28 may be alterately positioned in line 18 instead of line 20 as shown.

The device operates generally as follows:

When the power is first applied, the rotor is not turning and a surge current passes through the run winding 12. The sensing resistor 22, which as aforesaid has a nominal value of the order of 0.02-1 ohm, produces a voltage drop sufficient to light the the LEDs 26 and 28. These, in turn, produce sufficient light to reduce the ohmic resistance of the photoresistor 36, which provides the necessary gate potential to trigger the triac. This occurs in a fraction of a cycle of the input AC current. As a result of the foregoing, the triac 34 is gated closed and start current is fed through the start capacitor 16 to the start winding 14. As the rotor accelerates, approaching synchronous speed, the current through resistor 22 is decreased to a level whereby LEDs 26 and 28 reach a cut off state. The light incident upon photoresistor 36 is eliminated, and therefore, its resistance increases to a level such that insufficient current is supplied to the gate of triac 34. Triac 34 is then in a cut off state and the start winding 14 is removed from the line.

In the event that an extreme load is encountered by the motor the current will increase through the run winding 12 thus increasing the current through the sense resistor 22, to light the LEDs 26 and 28 and gate the triac 34. Thus, during heavy load conditions the start winding 14 is cut in at a time prior to stalling of the rotor, and additional torque is delivered from the start winding 14.

An optional transient suppressant circuit 35 can be disposed across the triac 34.

Here also terminals 19 and 21 are indicated at the connection of the triac first main power terminal and to the sensing resistor 22 and the run winding 12, and at the connection of the second main terminal to the start capacitor 16, respectively. These indicate the connection points of this device to an existing AC induction motor. This entire motor start control circuit can be packaged in a three terminal TO220 casing or the like, consisting of terminals 19, 20, and 21. The source terminal 18 and the aforementioned terminals will readily connect to any motor for complete system operation.

Preferably, the sensing resistor 22 is a thick film resistor deposited on a suitable substrate, and, as such, has a suitably large power dissipation capability. The triac 34 can be mounted on the same substrate which will have sufficient dissipative thermal capacity to handle all of the motor current, noting that the voltage drop across the triac is typically 1.5 volts.

The dark resistance of the photoresistor 36 is typically on the order of several megaohms; but, when illuminated by the LEDs 26 and 28, the photoresistor value drops to the order of 100 ohms or less to provide adequate gate current to render the triac conductive and energize the start winding 14. Typically, the in rush current at start up is on the order of six to ten times the steady state run current, and the value of the sense resistor 22 and the current limiting resistor 30 are selected so that the light from the LEDs 26 and 28 is sufficient to close and open the triac 34 as appropriate. Whenever the motor slows down while current is being applied, that slowing down indicates an increase in load. Therefore, a commensurate increase in total current passing through the sense resistor 22 will again illuminate the LEDs 26 and 28 and cause the start winding 14 to be re-energized or reinserted in circuit.

FIG. 1A shows an alternative embodiment of this invention in which the elements that are identical with those of the first embodiment are identified with the same reference numbers and a detailed description thereof is omitted. In this embodiment, the sensing resistor 22 is connected in series with the run winding 12 but not with the start winding 14 and start capacitor 16. This circuit has a start winding cut-in speed substantially the same as the cut-out speed, as the amount of start winding current does not affect the voltage drop across the sensing resistor 22. Otherwise, the operation of this embodiment is generally the same as that of the FIG. 1 embodiment.

Figure 2:
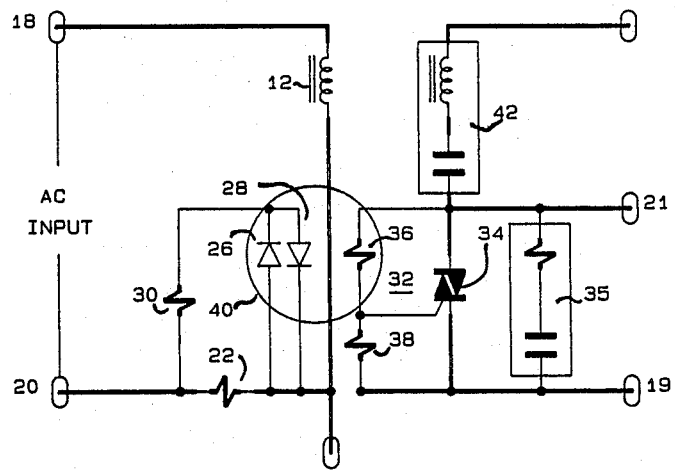
FIG. 2 is a third embodiment of this invention adapted for controlling a separate auxiliary device.

FIG. 2 is a circuit diagram of a third embodiment of this invention in which the solid-state AC switching circuit 32 is connected with an auxiliary device 42 rather than with the start winding 14 and start capacitor 16, as in the previous embodiments. In this case, the auxiliary device 42 can be a redundant system, auxiliary motor, alarm, or load-shedding clutch, which is employed, for example, during start up or when the motor load becomes excessive. The use of the device, as shown in FIG. 2, is not limited to single phase AC induction motors, but can be employed in any equivalent electrical circuit in which the starting current is different than the steady state current. This could, for example, include transformers and multi-phase motors of the type not normally provided with start windings.

Figure 3:
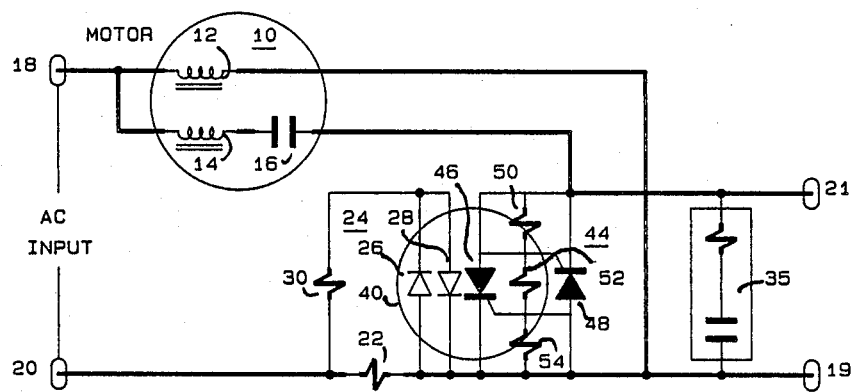
Figure 3:
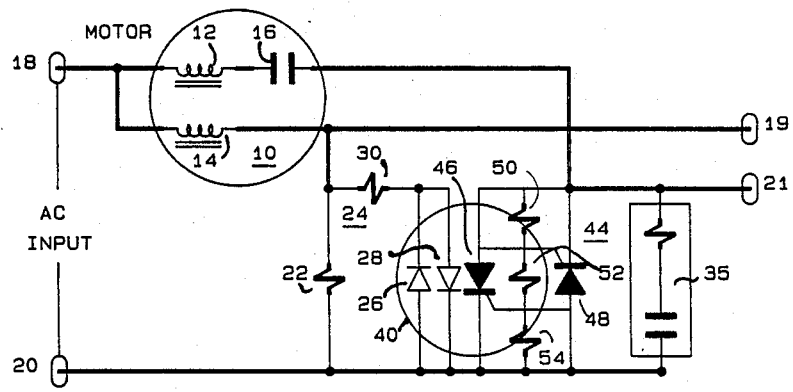

FIG. 3 shows yet another embodiment of this invention which is similar to that of FIG. 1, and in which similar elements are identified with the same reference numbers, so that a detailed description of those like parts can be omitted. This embodiment is intended for high power i.e., high current operation, and instead of the triac-based switching circuit 32, a solid-state switching circuit 44 is employed. This circuit 44 is formed of a pair of silicon controlled rectifiers (SCRs) 46 and 48 connected back-to-back, that is anode-to-cathode, in circuit with the start winding 14 and start capacitor 16. The SCRs are gated by a series circuit formed of a first ohmic resistor 50, a photoresistor 52, and a second ohmic resistor 54, the series circuit being connected across the back-to-back SCRs 46 and 48. The gates of these SCRs 46 and 48 are connected at the junctions of the photoresistor 52 with the ohmic resistors 54 and 50, respectively. In this case, light from the LEDs 26 and 28 incident on the photoresistor 52 lowers the resistance of the latter sufficiently to join the gates electrically, and render both of the SCRs 46 and 48 conductive. When the level of light from the LEDs 26 and 28 drops, i.e., when the motor attains running speed, the ohmic value of the photoresistor 52 increases, thereby gating the SCRs 46 and 48 off. Alternatively, a light activated SCR could be employed thereby eliminating the need for the photoresistor.

FIG. 3A illustrates another embodiment of this invention with the SCR-based switching circuit 44, but configured with the sense resistor 22 in circuit with the run winding 12, but not with the start winding 14 and start capacitor 16, as in FIG. 1A.

Figure 4:
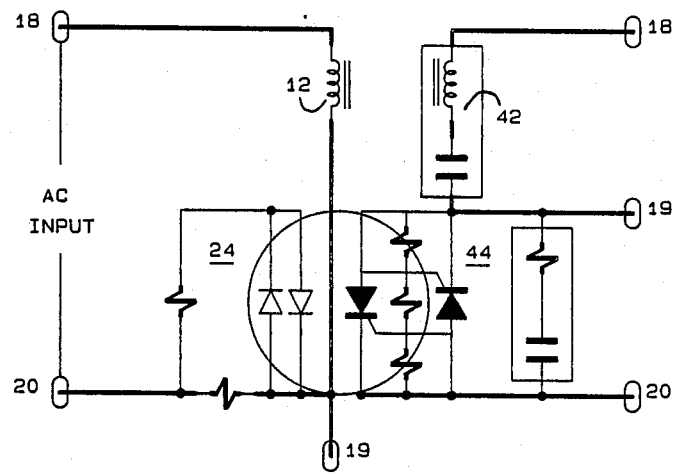

FIG. 4 is a diagram of yet another embodiment of this invention here employing the SCR-based switching circuit 44 in an auxiliary device control circuit like that of FIG. 2.

Figure 5:
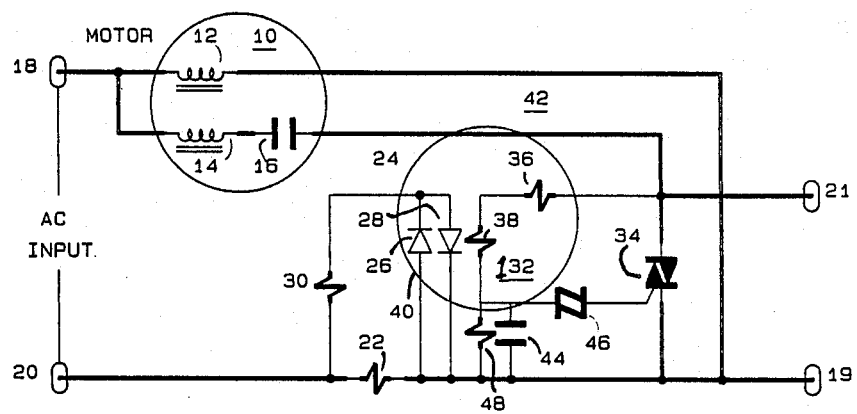
FIGS. 5 and 6 are diagrams of seventh and eighth embodiments of this invention which employ a diac/triac control.
Figure 6:
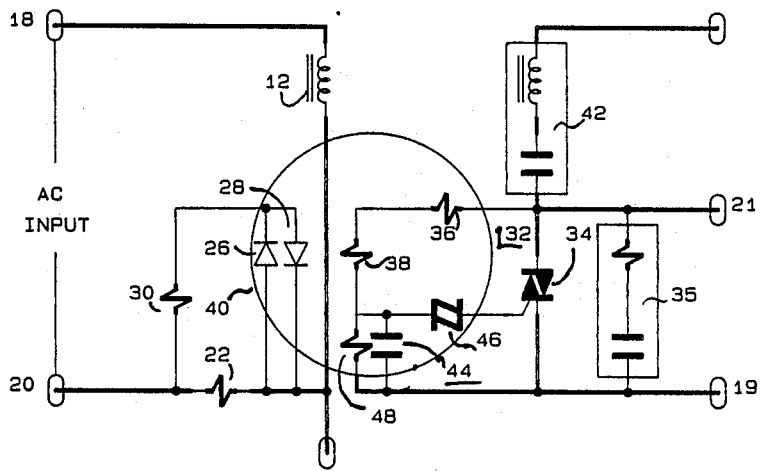

FIGS. 5 and 6 are yet further embodiments similar to those of FIGS. 1 and 2, but having a solid-state switching circuit 132 employing a triac 34, a photoresistor 36, and an ohmic resistor 38, as in FIGS. 1 and 2. Here, a capacitor 44 is connected in series after the ohmic resistor 38, with a diac 46 coupled between the junction of the capacitor 44 and resistor 38 and the gate of the triac 34. Another optional component 48 is in parallel with the capacitor 44, and this component 48 serves for thermal shutdown of the start winding 14 or auxiliary device 42 under predetermined over-temperature conditions.

In the FIGS. 5 and 6 embodiments, there is a phase control of the triac 32 so that the current through the start winding 14 or the auxiliary device 42 varies with the overall current draw. During in rush, the start winding is full on, but is gradually phased out as the input current decreases.

As stated earlier, the voltage across resistor 22 is proportional to the current. Simultaneously the light intensity increases with increased current through resistor 22. Photoresistor 36 decreases its resistance inversely with increased light intensity of LEDs 26 and 28. As photoresistor 36 decreases its intensity with increased LEDs current the time constant of the combination photoresistor 36, resistor 38, and capacitor 44 decreases thus triggering diac 46 earlier in the cycle which in turn provides higher voltage to the start winding 14. This combination constitutes a phase control action which in turn provides the exact voltage required by the start winding for providing the necessary torque as dictated by the load.

Resistor 48 is a negative temperature coefficient resistor selected to a value of high resistance during normal temperature excursions of the motor windings. When the temperature of the windings increases to unacceptable levels, resistor 48 is decreased to a value whereby the voltage divider ratio of resistors 36, 38, and 48 does not allow the voltage level required to trigger diac 46. Diac 46 may be replaced by other equivalent trigger devices for the same purpose.

Figure 7:
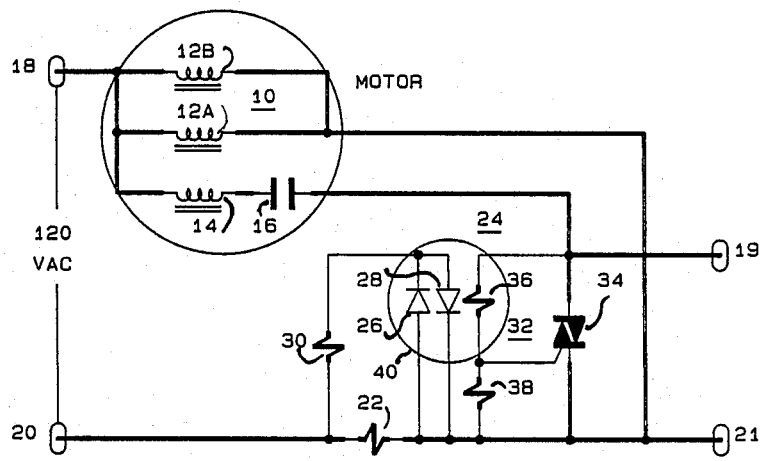
FIGS. 7 and 8 are diagrams of ninth and tenth embodiments of this invention demonstrating multiple run windings as in a dual voltage motor.
Figure 8:
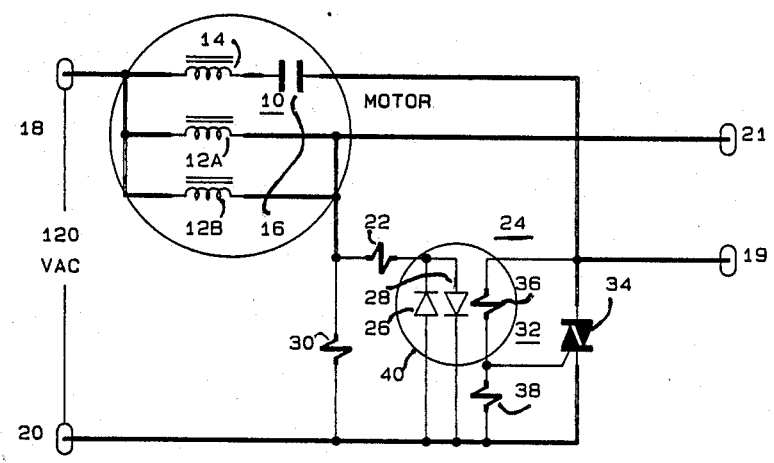

FIGS. 7 and 8 are alternative embodiments in which the sense resistor 22 receives currents from two or more run windings 12A and 12B connected in parallel. In FIG. 7 the current through the start winding 14 also passes through the resistor 22, while in FIG. 8 the start current does not.

As shown in FIG. 9 embodiments of this invention can employ its thermal cut out heater resistor 48 as the sense resistor 22 rather than employing a separate resistor. In this type of device a thermal cut out switch 55, for example, a bi-metalic leaf, is connected in series with the run and start windings 12 and 14, and this is heated by the resistor 48. The voltage drop across the resistor 48 increases with increasing motor current. Generally, the thermal inertia of the heater 48 and the thermal cut out switch 50 is sufficient that the LEDs 26 and 28 will light sufficiently to close triac 34 and energize the start winding 14 prior to opening the thermal cut out switch 55. These thermal cut out switches are a standard protective feature on AC induction motors.

Figure 10:
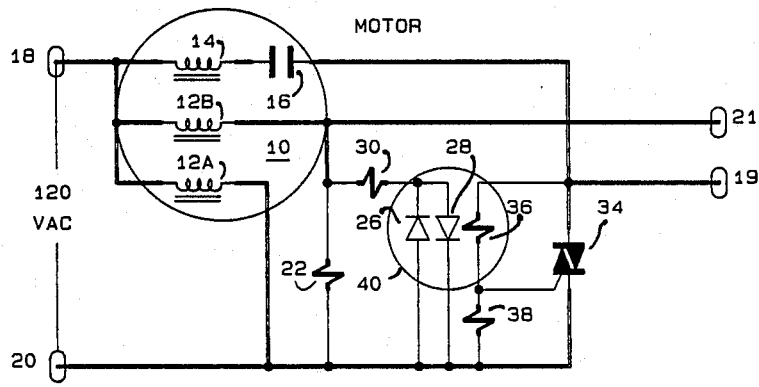
FIGS. 10, 11, and 12 are diagrams of twelfth, thirteenth, and fourteenth embodiments of this invention, respectively, which employ multiple run windings.
Figure 11:
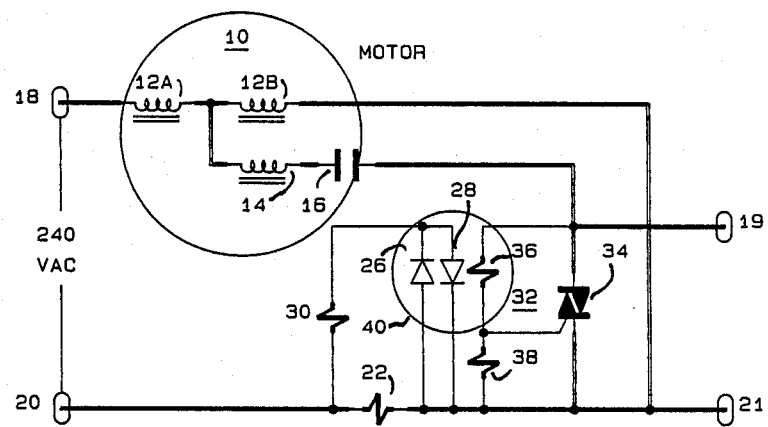
Figure 12:
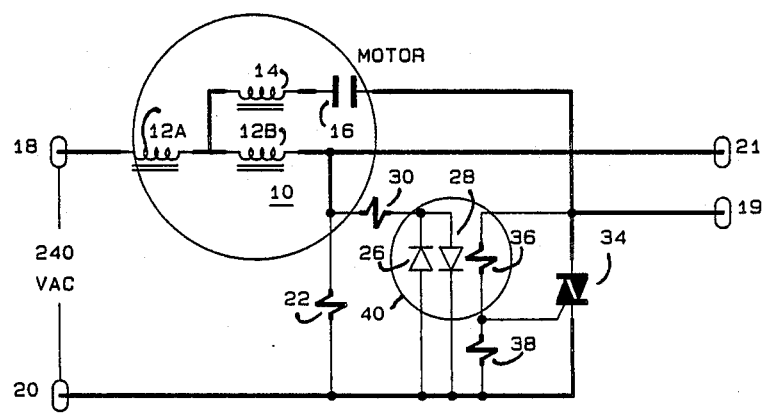

FIGS. 10, 11, and 12 show versions of this invention in respect to a dual-voltage motor in which there are two run windings 12A and 12B with the sense resistor 22 being connected in series with only one of the run windings, 12B (in the 120 volt mode of FIG. 10), but in series with both of the run windings 12A and 12B in versions shown in FIGS. 11 and 12. In each of these versions, the start winding 14 is connected to the junction of the run winding 12A and 12B and encounters a 120 VAC voltage. The configurations shown in FIGS. 10 and 11 demonstrate how the present invention may operate on a dual voltage motor without modification as the in rush and steady-state currents encountered by the sense resistor 22 is the same in both applications.

Figure 13:
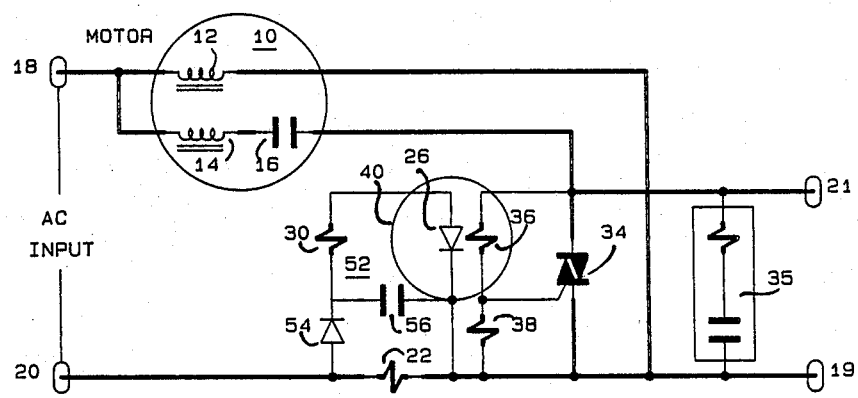
Figure 13:
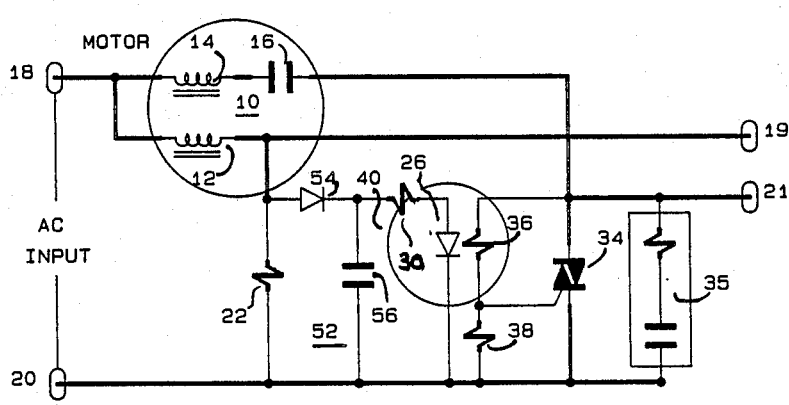

FIGS. 13 and 13A show further alternative embodiments of this invention wherein the light emitting circuitry assiciated with the sensing resistor 22 is a DC rectified illumination source 52, formed of an optional diode rectifier 54 and a filter capacitor 56, supplying rectified DC current through the current limiting resistor 30 to a single LED 26. In these versions, the LED 26 is on continuously and does not shut off between cycles of the alternating current through the sensing resistor 22. Consequently, the triac 34 is turned on and held on continuously through the initial start up and during any overload condition. Nevertheless, the triac 34 will turn off within one or more cycles after the motor attains its normal running speed. The versions of FIG. 13 and FIG. 13A differ in that in FIG. 13 the sensing resistor 22 is in circuit with both the run and start windings 12 and 14, while in FIG. 13A the resistor 22 is in circuit only with the run winding 12.

Figure 14:
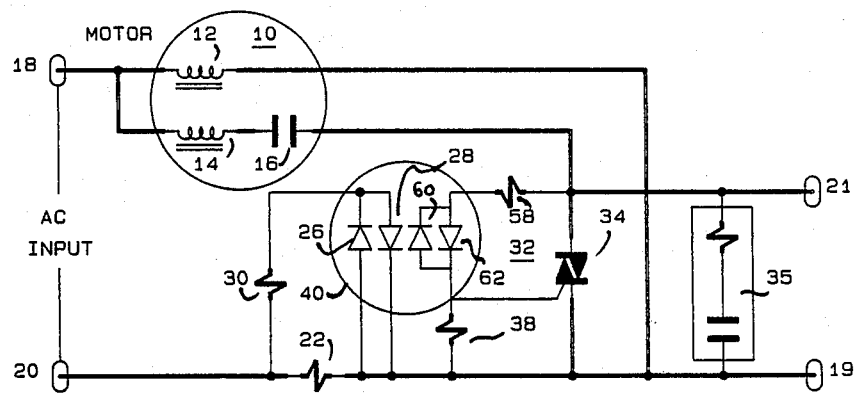
Figure 14:
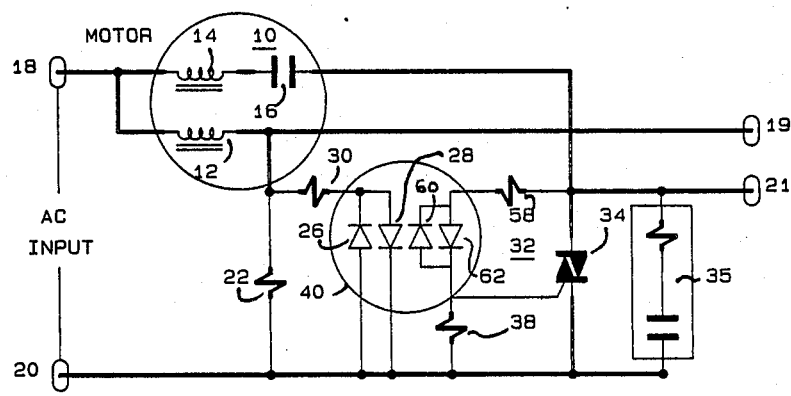

FIGS. 14 and 14A depict yet further embodiments of this invention, similar to those of FIGS. 1 and 1A, respectively, but wherein the photoresistor is replaced by an ohmic resistor 58 in series with a pair of back-to-back photodiodes, or equivalent semiconductor devices such as light activated silicon controlled rectifiers, transistors or a solid-state relay, inclusive or exclusive of zero voltage switching, driven by an LED, 60 and 62. The gate of the triac 34 is connected to the junction of the ohmic resistor 38 with the back-to-back photodiodes 60 and 62.

Many further embodiments of this invention are possible without departing from the main principles of this invention. For example, in extremely high voltage operation, that is, above 240 VAC, a stacked triac configuration could be employed in which a pair of solid-state AC switching circuits 32, of the type shown in FIG. 1, are coupled in series with the start winding 14 and start capacitor 16 and with the light dome or other light conduit 40 bringing the light from the LEDs 26 and 28 to the photosensitive element of each such circuit 32.

Also, arrangement of triacs, SCRs or power transformers could be employed to increase the current carrying capacity. Also, the resistor 30 could be a variable resistor to enable selection of a predetermined motor speed threshold by selecting the luminosity of the LEDs.

The arrangements of these embodiments have the further advantage that the sensing resistor 22 acts as a fuse and will burn out, rather than fuse closed, in an extreme overload condition, thereby protecting the run and start windings of the motor from over current damage.

While the invention has been described with respect to certain preferred embodiments, it should be understood that many modifications and variations thereof would present themselves to those of skill in the art without departure from the scope and spirit of this invention, as defined in the appended claims.

What is claimed is:

1. Start circuit for a single-phase AC induction motor of the type having at least one run winding connected to a pair of AC inputs and a start winding connected with or without as start capacitor to said AC inputs during a start-up operation but which is cut out from said AC inputs when said motor has achieved running speed, the motor also having a thermal cutout switch in series with the run winding that includes a heater resistor in series with said run winding developing a voltage thereacross that varies with the current through the run winding; the start circuit comprising

- a light emitting diode connected to said heater resistor providing light output whose intensity depends on said voltage;
- AC current switch means having a gate electrode and having current electrodes in series with said start winding;
- photosensitive circuit means including a photosensitive element and producing an output signal that depends on the intensity of light incident on the photosensitive element having an output supplying said output signal to the gate electrode of said AC current switch means; and light conduit means carrying said light output from said light emitting diode to said photosensitive element.

2. Start circuit as defined in claim 1 wherein said light emitting diode includes a pair of back-to-back coupled LEDs connected across said impedance means or incandescent lamp or the like.

3. Start circuit as defined in claim 1 wherein said light conduit means includes a light dome containing said light emitting diode and said photosensitive element.

4. Start circuit as defined in claim 2 wherein said AC current switch is a bidirectional solid-state device or pair of inverse parallel unidirectional devices.

5. Start circuit as defined in claim 1 wherein said AC current switch is a triac having a pair of current-carrying electrodes and a gate electrode.

6. Start circuit as defined in claim 5 wherein said photosensitive circuit means includes a photoresistor and an (optional) resistor forming a series circuit across the current carrying electrodes of the triac, with a junction therebetween forming said output electrode and connected to the gate electrode of the triac.

7. Start circuit as defined in claim 5 wherein said photosensitive circuit means includes a pair of photodiodes connected back-to-back in series with a pair of resistors, the pair of photodiodes being disposed between said pair of resistors, each of the resistors being coupled to a current carrying electrode of said triac, the junction of one of said resistors with said photodiodes forming said output electrode that is connected to the gate electrode of the triac.

8. Start circuit as defined in claim 1 wherein said light emitting means includes a LED and rectifier circuit means coupled across said impedance means to supply a DC current to said LED.

9. Start circuit for actuating an AC induction motor of the type having at least one run winding coupled to an AC input and a thermal cutout switch having a heater resistor in series with said run winding, the start circuit comprising:

AC current switch means having current electrodes in series with said AC powered device and a gate electrode; and gating means having an input coupled to said heater resistor and an output coupled to the gate electrode of said AC current switch for supplying an output signal to said gate electrode that depends on the voltage across said heater resistor in which said gating means includes a light emitting diode coupled to said heater resistor to light when the current therethrough is above a predetermined value; photosensitive circuit means including a photosensitive element and producing an output signal that is switched on or off in accordance with the intensity of light incident thereon and having an output supplying said output signal to the gate electrode of said AC current switch means; and light conduit means carrying a light output from said light emitting diode to said photosensitive element.

10. Start circuit as defined in claim 1 wherein said heater resistor is in series with said run winding but not said start winding.

* * * * *